Feb. 13, 1951    M. P. LAURENT    2,541,968
GATE VALVE

Filed April 25, 1949    2 Sheets-Sheet 1

Inventor
M. P. Laurent
By
ATTORNEY.

Feb. 13, 1951     M. P. LAURENT     2,541,968
GATE VALVE

Filed April 25, 1949     2 Sheets-Sheet 2

Inventor

M. P. Laurent

By

ATTORNEY

Patented Feb. 13, 1951

2,541,968

UNITED STATES PATENT OFFICE 2,541,968

GATE VALVE

Milton P. Laurent, Houston, Tex., assignor to W-K-M Company, a partnership

Application April 25, 1949, Serial No. 89,520

7 Claims. (Cl. 251—70)

This invention relates to "through conduit", sliding gate valves, especially those of large size employed to control the flow in conduits carrying large volumes of fluids which may be under rather high pressure. By the term "through conduit" is meant a valve which, when fully open, renders the conduit entirely unobstructed to flow at the valve opening.

Sliding gate valves are used extensively in oil field and oil refinery pipe lines. These pipe lines not only commonly are of large diameter, necessitating the employment of valves of commensurate size, but also frequently carry fluid under extremely high pressures. Gate valves for controlling the flow in such pipe lines usually are provided with a ported valve gate of sectional or multi-part construction adapted to handle pressure from either side. The sectional gate has relatively movable sealing elements which are forced apart mechanically to seat oppositely against the opposed valve seats that surround the ports in the valve housing. This expansion of the valve gate effects a tight seal between the gate and the valve seats in both open and closed positions. In valves of known construction, the mechanical forces, which seat the sealing elements of the gate, usually are provided by a wedging action between the separate sections of the gate. Such wedging action takes place during the final movement of the gate, propelled by a valve stem, into fully open or fully closed position.

Although manual operation of large or high-pressure valves of the type under consideration frequently is difficult, such valves are infrequently equipped with power operating means. The reasons for such infrequent use of power operating means are several. The possibility of failure of some types of power is always present. Electric power means are expensive; while existing constructions which utilize fluid pressure power means, particularly if pneumatic, tend to cause jerky and uneven movement of the valve gate with consequent damage to the valve. Furthermore, power operation alone does not provide the desired fineness of control obtained by manual operation. On the other hand, manual operation alone of high pressure gate valves of the larger type is sometimes so difficult, particularly when the design rated pressure is exceeded or a pressure lock occurs within the valve casing, that unusual leverages are applied to the handwheel in an effort to operate the valve. Such practice is, of course, dangerous to human life when the valve is under high pressure, and also often results in damaging the valve to such an extent that it fails. Many instances of such valve failures are on record which involved not only lost production, but also in some cases the loss of an oil well.

Hence, it is an object of this invention to provide a gate valve, capable only of manual operation, with power means to assist such operation.

It is another object of this invention to provide a manually-operable gate valve with inexpensive power means acting directly and positively on the valve gate to assist manual operation of the valve.

It is still another object of this invention to provide a manually-operable gate valve with fluid pressure power means to assist manual operation of the valve.

It is a further object of this invention to provide a gate valve with manual operating means and power means to assist such manual operation, and in which the valve gate is balanced against the fluid pressure obtaining in the valve housing.

Other objects and advantages of this invention will be apparent from the following description and accompanying drawings, in which.

Figure 1:
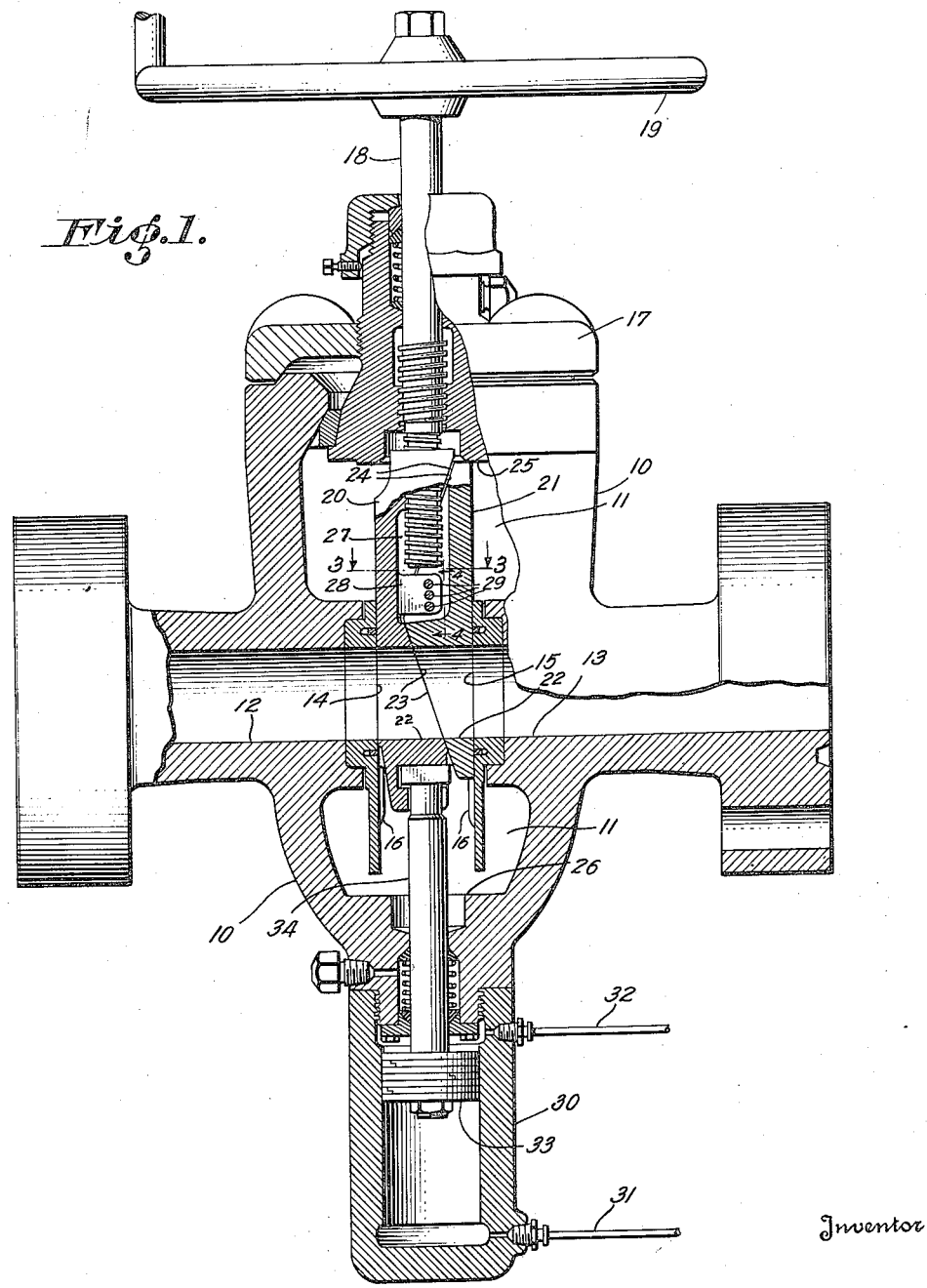
Figure 1 is an elevational view, partly in section, of a gate valve embodying this invention. The valve is shown in open position with the gate sections expanded into sealing engagement with the valve seats.
Figure 2:
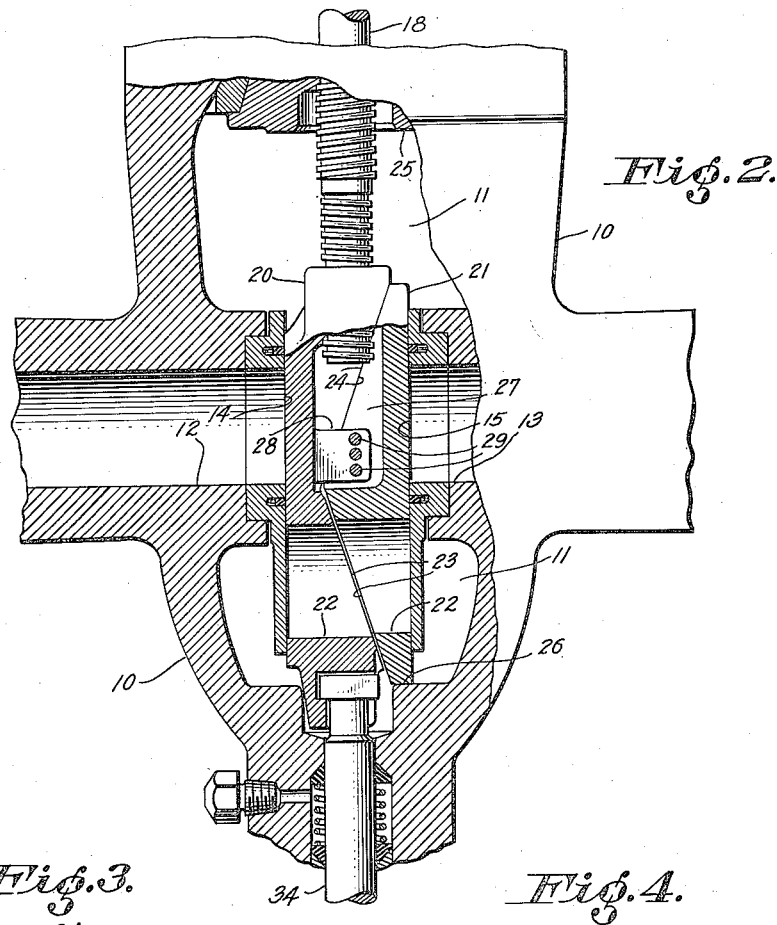
Figure 2 is a fragmentary view corresponding to Figure 1, but showing the valve in closed and sealed position.

Referring to the drawings, there is shown a through conduit gate valve of the wedging seal type, such as that disclosed in United States Letters Patent to M. P. Laurent, Reissue No. 20,101, dated September 8, 1936. The valve has a housing 10 provided with an interior chamber 11 in which is housed the gate mechanism of the valve. Aligned ports 12 and 13 formed in opposite walls of the housing are provided with parallel, preferably removable, valve seats 14 and 15. These seats have lateral side flanges 16, which together with the seats serve to guide and confine the gate mechanism to substantially rectilinear movement. The upper portion of the housing is of known construction, having a bonnet 17 through which extends a valve operating stem 18. The stem illustrated is of the "rising" type which is connected by two axially spaced sets of threads of opposite pitch to both the bonnet and the gate mechanism, as shown. Rotation of the stem 18 by a conventional handwheel 19 effects relative movement in opposite directions between the stem and the bonnet and between the stem and the gate mechanism. Hence, operation of the handwheel rapidly raises or lowers the gate mechanism to open or close the valve. Although a particular valve stem has been shown, other types of manually-operable threaded valve stems, either of the rising or non-rising type, can be employed.

The ported valve gate mechanism, which slides between the seats 14 and 15 in the guides 16, is formed in two sections, one herein termed the gate 20 and the other the segment 21. Both sections have ports 22 which in the open position of the gate mechanism, as shown in Figure 1, are aligned with the ports 12 and 13 in the housing to permit unobstructed passage of fluid through the valve. The valve stem 18 is threadedly connected to the gate 20, endwise movement of which by the stem carries the segment 21 along as a unit, as will be described later.

Figure 3:
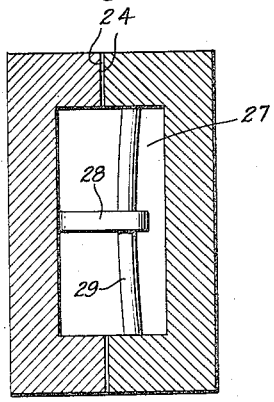
Figure 3 is a fragmentary sectional view taken on line 3—3 of Figure 1 showing the valve gate contracting springs.

The gate 20 and segment 21, when assembled, are substantially rectangular in horizontal section, as shown in Figure 3, so that their flat outer faces sealingly engage the corresponding flat-faced valve seats 14 and 15. It is obvious, however, that the sealing faces of the gate sections and corresponding faces of the valve seats may be arcuate or other suitable shape in horizontal section, i. e., that section shown in Figure 3.

The inner opposed faces of the gate and segment are formed in two angularly related planes which diverge transversely of the gate mechanism from a central waist portion to provide two sets 23 and 24 of mutually wedging surfaces. The transverse proportions of the gate and segment are such that when both sets 23 and 24 of inner wedging surfaces of these sections are in contact, i. e., the gate and the segment are mated, the overall transverse dimension of the gate mechanism is slightly less than the distance between the valve seats. Hence, when the gate mechanism is fully contracted, sufficient clearance exists between the mechanism and the valve seats to enable the mechanism to be moved freely and easily by the valve stem. Relative endwise displacement, however, of the gate and segment from their mated position, in either direction along the line of travel of the gate mechanism, results in a mutual wedging action between the wedging surfaces of one of the two sets of such surfaces. This wedging action is effective to expand the gate mechanism and force the outer sealing faces of the gate and segment oppositely into tight sealing engagement with their respective valve seats. Such relative endwise movement is imparted to the gate and segment adjacent both ends of travel of the gate mechanism by interior shoulders or projections 25 and 26 on the bonnet 17 and lower portion of the housing, respectively. These shoulders are engaged by the corresponding ends of the segment 21 and stop the travel thereof just before the gate 20, impelled by the valve stem, reaches its final limit of travel. Hence, the gate mechanism is expanded into tight sealing engagement with the valve seats in both the open and the closed positions of the valve.

Figure 4:
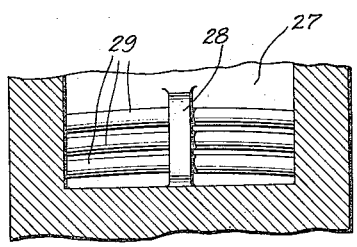
Figure 4 is a fragmentary sectional view taken on line 4—4 of Figure 1 showing the valve gate contracting springs.

In order to contract the gate mechanism, once the expanding force thereon is relieved, so that it may be moved freely and easily between the valve seats, positively acting means are provided to effect relative endwise displacement of the gate and the segment in directions opposite to that effected during the final opening or closing movement, respectively, of the gate mechanism. Such means acts to return the gate and segment from their wedged position to their mated position wherein both sets 23 and 24 of their inner wedging surfaces are in contact. The gate mechanism contracting means is located in the lower portion of a chamber 27 formed by opposed recesses in the inner faces of both the gate and the segment. The upper portion of the chamber receives the inner or lower end of the valve stem. A transverse lug 28 projects from the bottom or back wall of the gate recess and extends into the segment recess. Laterally-extending normally-straight resilient bars or rods 29 are snugly mounted in correspondingly shaped bores or openings in the side or lateral walls of the segment recess with the central portion of the rods passing through similarly shaped openings or bores in the lug 28. The bores in the lug are so positioned with respect to the bores in the walls of the segment recess (as shown in Figures 3 and 4) that in all relative positions of the gate and segment, even when the gate mechanism is contracted, the resilient rods are flexed or bowed so as to exert a transverse force on the gate and segment to hold these sections together. Additionally, the rods resist relative endwise displacement, in either direction, of the gate and segment from their mated position. If such endwise displacement does occur, as the result of a wedging action, when the displacing forces are relieved, the rods forcefully contract the gate mechanism, i. e., return the gate and segment into the position wherein both sets of their wedging surfaces are in contact.

Three resilient rods 29 are illustrated, but the exact number employed depends upon the contracting forces needed and, to some extent, on the size of the valve. Additionally, such contracting rods or springs may be constructed in accordance with the disclosure of my copending application Serial No. 783,735, now Patent No. 2,479,124, August 16, 1949.

The contracting function of the rods 29 is particularly important in this type of valve for preventing the occurrence of a situation known as "pressure lock." Such a situation may develop when the valve is in closed position and the pressure obtaining in the valve chamber 11 is greater than that on both sides of the line. When a valve of this type is in a pressure lock condition, it requires a much greater force than usual to initiate movement of the gate mechanism from closed to open position. As more particularly described in the aforementioned copending application, however, the contracting springs or rods 29 prevent the occurrence of a pressure lock.

Even when conditions favoring a "pressure lock" are not present, initial movement of the gate mechanism in large valves of this nature is difficult of manual performance. Since the gate mechanism is wedged tightly in both open and closed positions, the wedging surfaces in use sometimes become corroded after an interval of non-operation. Such corrosion makes the valve gate mechanism stick to such an extent that a large force is required to "start" or initiate movement of the mechanism. Fluid pressure seating forces also must be overcome during valve operation. Such forces exist when the pressure on one side of the line is greater than that on the other. Such a condition usually occurs during and after the closing of the valve against high pressure. Under this condition that section of the gate mechanism which seals the low pressure side is under a differential pressure which results in a high sliding friction between that section and its seat.

Accordingly, manual strength, even with the leverage afforded by the usual handwheel 19, sometimes is insufficient to initiate movement of the valve, particularly the larger types that are under high pressure. Additionally, if the design rated pressure is exceeded in service, the fluid pressure seating forces may become so large that manual operation is exceedingly difficult, if not impossible. Hence, handwheel leverage often is supplemented by a lever bar inserted between the spokes, which bar frequently is struck with a sledge hammer to "start" the valve. Such practice not only may twist the valve stem in two, strip the threads, or shear the thrust collar, if the valve has a non-rising stem, but also is extremely dangerous to the operator. Under these high pressures frequently present, a leak or crack in the valve housing might emit a jet of fluid of such high velocity that it would be dangerous to human life. If such fluid is combustible, the fire hazard would be tremendous.

Accordingly, this invention provides simple and inexpensive power means acting directly on the gate mechanism to assist manual operation of the valve. This means in no sense renders the valve a power operated valve. The valve at all times is controlled and can be operated only by operation of the handwheel 19.

Threadedly connected to the valve housing 10 and projecting therefrom is a power cylinder 30. The cylinder is disposed on the opposite side of the housing from the handwheel in alignment with the valve stem 18. As an alternative construction, not shown, the cylinder may be formed as an integral part of the housing and be provided with a removable closure on its outer end. Conventional fluid connections 31 and 32 are employed which are adapted to admit fluid under pressure selectively into each end of the cylinder 30. A piston 33, slidably mounted in the cylinder, is provided with a connecting rod 34 which sealingly passes through a conventional packing gland in the wall of the valve chamber and is detachably connected, as by a T-head and slot, to the lower end of the gate 20. The connecting rod 34 preferably is of the same diameter as the valve stem 18 in order to eliminate unbalanced endwise forces on the gate mechanism, which otherwise would be caused by a differential piston action of the rod 34 and stem 18, when there is pressure in the valve chamber 11. The valve balancing effect of such a construction is more fully described in United States Letters Patent to M. P. Laurent No. 2,161,175, issued June 6, 1939.

The cylinder 30 may be supplied through suitable control valves (not shown) with pressure fluid from any convenient or conventional source, such as a pump or the line in which the valve is connected. If the line in which the valve is connected is used as the source of pressure fluid, the effective working area of the piston preferably is proportioned according to the size of the valve, i. e., the diameter of the valve ports 12 and 13 and, hence, the area of the gate mechanism exposed to line pressure. The ratio between such areas obviously may be so designed that the power available from the line is equal to the power necessary to move the gate mechanism against the action of the fluid pressure seating forces acting thereon, plus or minus a factor for miscellaneous friction, wear, etc.

In operation, to close the valve, fluid pressure is admitted into one end of the cylinder through the connection 32 and the other end of the cylinder is vented to atmospheric pressure through the connection 31. The rod 34 consequently exerts an endwise force on the gate mechanism to urge it to closed position. The threads on the valve stem 18, however, prevent movement of the gate mechanism by the rod 34 until the handwheel 19 is turned in a direction to close the valve. Because most of the force necessary to close the valve is supplied by the power cylinder, the handwheel may easily be turned to smoothly and evenly move the gate mechanism to closed position. The power cylinder supplies a sufficient closing force acting directly endwise on the gate mechanism that very little leverage is needed on the handwheel. Furthermore, the rate of closing and the final clearance between the gate mechanism and the valve seats may be finely controlled by the operator of the handwheel. Once the valve is closed, the pressure may be relieved in the cylinder 30. The valve is opened by admitting pressure fluid to the opposite end of the cylinder through the connection 31, venting the other end through the connection 32, and turning the handwheel in the reverse direction.

The power required throughout the valve opening movement of the gate mechanism, after its initial opening movement, is substantially uniform. Hence, if gas instead of liquid pressure is used to operate the power cylinder, the gas pressure may be shut off after the initial opening movement and expansion of the gas, without further supply, relied upon to move the piston 33 throughout the balance of its valve opening stroke. Since maximum power is usually required, however, at the end of the valve closing movement of the gate mechanism, pressure gas to close the valve should be admitted to the cylinder throughout the entire closing stroke of the piston.

It is obvious that various changes may be made in the specific embodiment used to illustrate this invention, and further, that the invention may be applied to gate valves other than the wedging seal type. Therefore, the invention covers all modifications which come within the spirit and scope of the following claims.

I claim:

1. A gate valve comprising: a housing forming a valve chamber having aligned ports provided with opposed parallel valve seats; a valve gate mounted for rectilinear movement between said seats to open and close the valve; manually-operable screw means free of lost motion for positively moving said gate to its open and closed positions, rectilinear movement of said gate being effected only upon operation of said screw means; and fluid-operated power means connected to said gate for assisting said screw means in the movement of said gate.

2. A gate valve comprising: a housing forming a valve chamber having aligned ports provided with opposed parallel valve seats; a valve gate mounted for rectilinear movement between said seats to open and close the valve; a handwheel disposed exteriorly of said housing; a positive connection free of lost motion between said handwheel and said gate for moving said gate to its open and closed positions only upon rotation of said handwheel, said connection including screw means connected to one end of said gate; and fluid-operated power means connected to the other end of said gate for assisting said handwheel in the movement of said gate.

3. A gate valve comprising: a housing forming a valve chamber having aligned ports provided with opposed parallel valve seats; a valve gate mounted for rectilinear movement between said seats to open and close the valve; manually operable means free of lost motion for positively moving said gate to its open and closed positions, said means including a valve stem and means threadedly engaging said stem for relative rotation therebetween, rectilinear movement of said gate being effected only by said relative rotation; a closed power cylinder positioned adjacent an end of said gate opposite said stem; a piston in said cylinder; and a rod aligned with said stem connecting said piston to said gate, whereby selective admission of fluid under pressure to said cylinder on opposite sides of said piston assists said manually operable means in the movement of said gate.

4. The structure defined by claim 3 wherein the stem and the connecting rod are of substantially equal cross-sectional area, whereby the gate is balanced against movement by fluid pressures obtaining in the valve chamber.

5. A gate valve comprising: a housing forming a valve chamber having aligned ports provided with opposed parallel valve seats; a ported valve gate mounted for rectilinear movement between said seats to open and close the valve, said gate comprising two abutting members having outer parallel faces to engage said valve seats and inner opposed faces formed in two inclined planes which diverge outwardly from the central waist portions of said members to provide two sets of wedging surfaces effective to force said members oppositely into sealing engagement with their respective valve seats when said members are shifted relative to each other in either direction along the line of travel of said gate; means in said housing for effecting said relative shifting of said members adjacent both ends of travel of said gate; manually operable screw means free of lost motion for positively moving said gate to its open and closed positions, rectilinear movement of said gate being effected only upon operation of said screw means; and fluid-operated power means connected to said one gate member for assisting said screw means in the movement of said gate.

6. The structure defined in claim 5 including resilient means connecting said gate members for constantly urging both said sets of wedging surfaces into contact.

7. A gate valve comprising: a housing forming a valve chamber having aligned ports provided with opposed parallel valve seats; a ported valve gate mounted for rectilinear movement between said seats to open and close the valve, said gate comprising two abutting members having outer parallel faces to engage said valve seats and inner opposed faces formed in two inclined planes which diverge outwardly from the central waist portions of said members to provide two sets of wedging surfaces effective to force said members oppositely into sealing engagement with their respective valve seats when said members are shifted relative to each other in either direction along the line of travel of said gate; means in said housing for effecting said relative shifting of said members adjacent both ends of travel of said gate; a handwheel disposed exteriorly of said housing; a connection free of lost motion between said handwheel and one end of one of said gate members for positively moving said gate to its open and closed positions only upon rotation of said handwheel, said connection including a valve stem and means threadedly engaging said stem for relative rotation therebetween, rectilinear movement of said stem being effected only by said relative rotation; a closed power cylinder mounted on said housing opposite said stem; a piston in said cylinder; and a rod aligned with said stem connecting said piston to the other end of said one gate member, whereby selective admission of fluid under pressure to said cylinder on opposite sides of said piston assists said handwheel in the movement of said gate.

MILTON P. LAURENT.

REFERENCES CITED

The following references are of record in the file of this patent:

UNITED STATES PATENTS

| Number | Name | Date |
| --- | --- | --- |
| 1,455,211 | Kelly | May 15, 1923 |
| 1,806,305 | Mueller | May 19, 1931 |
| 1,854,058 | Otis | Apr. 12, 1932 |
| 1,888,392 | Penick | Nov. 22, 1932 |
| 2,161,175 | Laurent | June 6, 1939 |
| 2,479,124 | Laurent | Aug. 16, 1949 |